Dec. 4, 1962

G. GRECO ETAL  3,067,177
PROCESS FOR PRODUCING CONCENTRATED UREA-FORMALDEHYDE SOLUTIONS
BY ABSORBING GASEOUS FORMALDEHYDE IN
AQUEOUS UREA SOLUTIONS
Filed Oct. 27, 1958

United States Patent Office 3,067,177
Patented Dec. 4, 1962

3,067,177
PROCESS FOR PRODUCING CONCENTRATED UREA-FORMALDEHYDE SOLUTIONS BY ABSORBING GASEOUS FORMALDEHYDE IN AQUEOUS UREA SOLUTIONS
Guido Greco, Luciano Luciani, and Umberto Soldano, all of Milan, Italy, assignors to Montecatini, Societa Generale per l'Industria Mineraria e Chimica, Milan, Italy, a corporation of Italy
Filed Oct. 27, 1958, Ser. No. 769,920
Claims priority, application Italy Oct. 30, 1957
10 Claims. (Cl. 260—69)

The present invention relates to a process for producing concentrated urea-formaldehyde solutions by absorbing gaseous formaldehyde in aqueous urea solutions.

It is a primary object of the present invention to provide a process for preparing concentrated urea-formaldehyde solutions which are stable and can be used with remarkable advantages as substitutes for aqueous formaldehyde solutions in processes for obtaining urea-formaldehyde condensation products.

By the term "concentrated urea-formaldehyde solution" as used herein, we mean a mixture of water, urea, formaldehyde and some addition compounds thereof, the concentration of each component being such that the mixture at room temperature is a stable liquid which does not undergo any turbidity or precipitation even during storage for long periods of time.

The addition compounds consist substantially of condensation products of the type of methylolureas, in the form of monomers or of low molecular weight polymers.

These compounds react very easily (under certain conditions) thus allowing all the formaldehyde and urea therein contained to be utilized. Moreover, they are mutually soluble so that their mixtures are liquid even when they contain very low water proportions.

The use of said solutions, produced as products of the invention, as substitutes for aqueous formaldehyde solutions in order to obtain urea-formaldehyde condensation products, such as molding masses, adhesives, sizes, impregnating agents and the like, makes it possible to avoid, completely or in part, the costly operation of vacuum concentration, which is necessary in order to eliminate the excess water and which involves big plant outlays as well as considerable consumption of steam, power and refrigerating water.

The concentrated urea-formaldehyde solutions produced are even preferable to paraformaldehyde. Although the latter compound also does not require any concentration, due to its solid nature, it is more expensive to handle than a stable liquid such as the former ones. This is especially true if we assume that the formaldehyde unit cost is the same in both cases. As a matter of fact the formaldehyde in urea solution produced by the process according to the present invention has a cost in the same order of magnitude as that of aqueous formaldehyde, a cost therefore lower than that of paraformaldehyde. Moreover, the fact that a portion of the urea to be used is already present in the solution and already combined with formaldehyde, makes the operations required to obtain the aforementioned products easier and faster.

Moreover, from the storage standpoint, the concentrated urea formaldehyde solutions produced offer some advantages both with respect to the aqueous formaldehyde, which at the commercial concentration is likely to form insoluble polymers, and to paraformaldehyde, whose reactivity decreases in time. The concentrated solutions in question, if properly prepared, remain in fact unaltered even after storage for several months.

The temperature range not to be exceeded for conditions of good storage of the product is much wider than that which is required; in practice the said solutions produced can in fact be stored without any alteration at temperatures ranging between −30° and +55° C.

We should finally take into account the low transportation cost per formaldehyde unit.

It is essential that in those solutions produced by the present inventive process, the molar ratio of total urea to total formaldehyde (that is, both free and chemically combined urea and formaldehyde) is comprised between 1:4 and 1:10 and that their combination takes place in a slightly alkaline medium, that is a medium at a pH of between 7 and 9.

The water proportion in the product produced (i.e. the proportion needed to complete to 100 the sum of the proportions of total urea and formaldehyde) in order to make the product stable is not relevant provided it is not lower than about 10%, since in this case the solution produced is of no practical or commercial interest due to its very high viscosity.

Many batch processes have been known for many years for preparing concentrated urea formaldehyde solutions from aqueous formaldehyde solutions. With respect to these known processes the process according to the present invention has the following main advantages:

It consists of only continuous operations,

It uses as a raw material for formaldehyde-containing gas coming from the methanol-oxidation plants, It is extremely simple as regards both its conception and its practical realization.

To achieve these ends and in accordance with a feature of the process of the present invention, the gas coming from a methanol-oxidation plant is contacted in a multistage absorption apparatus with an aqueous urea solution fed in counter current. Of the absorption stages the first one is particularly important. In this stage the gas having the highest formaldehyde concentration is contacted with the solution having the desired concentration of the end product.

The following phenomena take place in this first stage:

Cooling of the gas to a temperature which depends, as will be set forth hereinbelow, on the desired concentration of the product;

Absorption of formaldehyde by the solution;

Condensation or evaporation of water, according to the working conditions;

Combination of formaldehyde with the still free urea, resulting in the formation of methylolureas.

In order to assure that the last above-mentioned reaction take place it is sufficient to keep the solution for one or two hours in the absorption apparatus at the working temperature, which can vary from 30° to 80° C., and at a pH of between 7 and 9, preferably 8.2.

These conditions in practice are very easily satisfied with a section of packed column in which the solution is re-circulated: this makes it possible to remove very easily the sensible heat of the gas, the formaldehyde absorption heat and the methylolation reaction heat, by cooling the solution in an apparatus outside the column.

The formic acid passed from the gas into the solution and that formed in the liquid phase through Cannizzaro's reaction must be neutralized by adding a strong base, e.g. sodium hydroxide until a slight alkalinity of the medium is reached.

Since the methylolureas are formed in the column, the solution leaving the absorption plant is a stable liquid which does not require any other operation for its storage or use. Moreover, due to the formation of these compounds which chemically block a portion of formaldehyde, the conditions of the equilibrium between the formaldehyde in the liquid and in the gaseous phase are clearly displaced towards a higher absorption. In this way, although the operation is carried out at the aforementioned relatively high temperatures, the gas leaving the first stage contains very low amounts of formaldehyde, corresponding to equilibrium partial pressures of between about 1 and 20 mm. Hg, depending on the temperature and concentration of the solution.

These small amounts of formaldehyde are absorbed in a limited number of stages with a urea solution fed to the plant.

Also in this case the absorption is facilitated by the reaction of formaldehyde with urea which is here in a high excess.

The solutions in which the molar urea-formaldehyde ratio is higher than 1/4 become turbid and a precipitate is separated after a period of time from their preparation.

The time required for the formation of turbidity and precipitation in these solutions in which the molar ratio of urea to formaldehyde ranges between 1:10 and 1:4, is on the order of some hours to some days; therefore, the realization of an absorption apparatus, in which the time of permanence of the unstable solution is lower than that necessary for their becoming turbid, does not present particular technological difficulties.

For instance, in the second stage a solution containing 40% total urea and 20% total formaldehyde can be formed; this solution becomes turbid at 40° C. and at a pH of about 7.5 within a time of between 4 and 10 hours; however, it can remain in the plant for less than 1 hour.

The presence of urea excess is sufficient to keep a pH of 7 to 9 in the stages following the first one. In certain cases it can also be necessary in the second absorption stage to neutralize the formic acid formed by means of an alkali addition.

The present invention can also be considered as relating to a process for recovering in the form of a highly concentrated solution, the formaldehyde contained in the gas coming from the methanol oxidation plants.

It is known that the said gas contains steam in amount almost equal to that of formaldehyde due to the fact that the air necessary for the reaction is moist, and that water is formed in the partial or complete oxidation of methanol.

On the other hand, in order to have a practically complete absorption of gaseous formaldehyde in water fed in countercurrent with the gas in a multistage apparatus, it is necessary to operate in the last stages at relatively low temperatures in the range of 15 to 25° C.

At these temperatures the vapour pressure of formaldehyde in its solutions reaches such values that its transition from the gaseous to the liquid phase does not require a number of stages higher than that which can be realized in practice. However, in this way the formaldehyde-free gas which is discharged through the chimney contains only a portion of the steam contained in the gas entering the absorption plant, since the remaining portion has been condensed causing dilution of the formaldehyde solution produced.

It is not possible therefore, to obtain from the gaseous products of conventional methanol oxidizing plants formaldehyde solutions having concentrations higher than 40–50%; on the contrary, as a rule a concentration of only 37% is obtained.

We have found that, by feeding an aqueous urea solution instead of pure water in countercurrent with the gas from methanol oxidation plants, a complete formaldehyde absorption is realized even by operating at temperatures remarkably higher than the ones mentioned above, i.e. up to 60–70° C. In fact, the formation of reversible addition products of urea and formaldehyde in the circulated solution makes the vapour pressure of formaldehyde extremely low.

In the following table some values of vapour pressure of formaldehyde, expressed in mm. Hg, are reported:

| $CH_2O$, percent by weight | over aqueous solution | | in solution containing water and urea in the ratio of 3:2 at 50° C. |
|---|---|---|---|
| | at 20° C. | at 50° C. | |
| 10 | 0.35 | 3 | *0.2 |
| 20 | 0.7 | 6 | *1 |
| 50 | 1 | 9 | 4 |

NOTE.—The values marked by an asterisk (*) were determined within some hours from the preparation of the solution, before the precipitation, without having reached the real equilibrium of the reactions in the liquid phase.

If, therefore, the gaseous medium free of formaldehyde is discharged at such high temperatures from the last absorption stage, the amount of aqueous vapour which leaves the plant is such that not only no condensation can take place but even the evaporation of a portion of the water fed with urea is obtained, if necessary.

Therefore it can easily be understood that any water proportion in the solution produced can be obtained by suitably varying the temperature of the exhaust gases and that this temperature will be determined in a like manner after having determined the water amount entering in the form of vapour or liquid, and the desired concentration of the end product.

The fact should be taken into account, that in all absorption stages the formaldehyde absorption increases as the temperature decreases, but, nevertheless, it is convenient that the temperatures of the stages preceding the last one are higher than that of the last stage, determined as said above. This is because, otherwise the water evaporation would take place in the last stages thus resulting in an increase in the concentration of the solutions and, therefore, in a dangerous reduction of the time needed for the formation of insoluble compounds.

In practice, it is convenient to keep the urea concentration not much higher than 50%, i.e. the limit of solubility at 20° C., and preferably to keep the first absorption stage at a temperature of about 5 to 10° C. higher than that of the last stage, also because of the fact that the vapour pressure of water depends to a considerable degree on its concentration in the solutions (the variations are obviously in the same direction).

The above-mentioned and further objects, advantages and features of the invention will be apparent from the following detailed description of the embodiments shown by way of example and referring to the accompanying drawing consisting of flow sheets of plants for carrying out the process according to the present invention, and in which.

Figure 1:
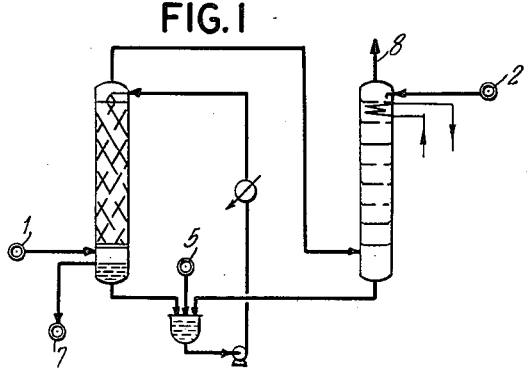
FIG. 1 represents the flow sheet of the simplest realization of a plant according to the invention.

In these figures, the reference numbers have the following meanings:

1 Feeding of the CH₂O containing gas
2 Feeding of urea solution
3 Feeding of urea without water
4 Feeding of water
5 Feeding of alkali (e.g. NaOH)
6 Feeding of ammonia
7 Solution produced (of urea formaldehyde)
8 Waste gases
9 Diluted aqueous formaldehyde solution
10 Hexamethylenetetramine solution.

In case it is desired to decrease the water amount entering the plant together with urea, because of the higher vapour content of the feed gas or due to the need of producing a highly concentrated urea-formaldehyde solution, some variations can be made in the simplest embodiment of the process, illustrated in FIG. 1.

(a) The aqueous urea solution can be prepared and fed at a higher temperature instead of at room temperature.

It can indeed have such a concentration as to correspond to the saturation at a temperature slightly lower than the working temperature of the last absorption stage. In this way, it is necessary to keep warm the apparatuses and the pipes in which the solution is prepared or through which it passes, because otherwise, solid urea precipitates out; while the treated materials should be in the liquid state, else the apparatus tends to become clogged and the operation to become blocked. If for instance the temperature of the last stage is 50° C., a urea solution containing only 33% water can be used instead of a solution containing 50 to 60% water as would be necessary for a solution kept at 10 to 20° C. (FIG. 1).

Figure 2:
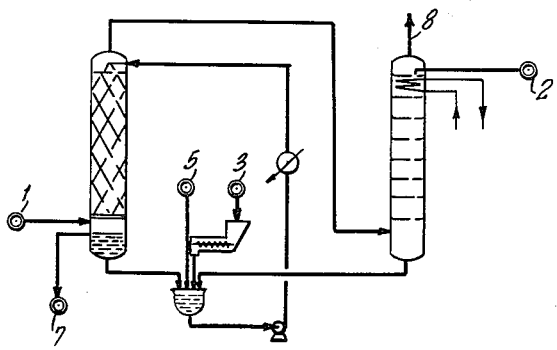
FIG. 2 is a flow sheet of an alternative embodiment in which urea is fed without water.

(b) As an alternative, it is possible to feed the absorption plant at the last stage, i.e. the top of the last absorption tower, with only a portion of the urea in aqueous solution in order to chemically block the formaldehyde contained in the gas entering the last stage; the remaining urea, free of water, is fed directly into the solution re-circulating in the first stage (FIG. 2).

Figure 3:
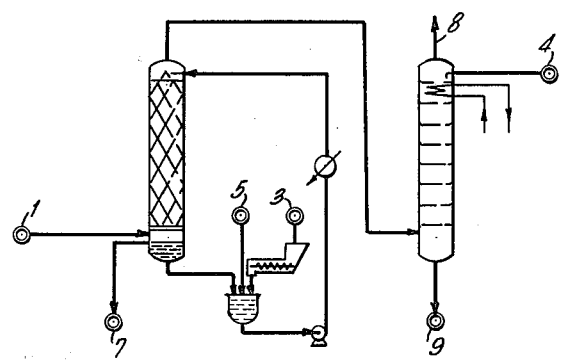
FIG. 3 is a flow sheet of an alternative embodiment to FIG. 2, and in which a diluted aqueous formaldehyde solution is also produced.
Figure 4:
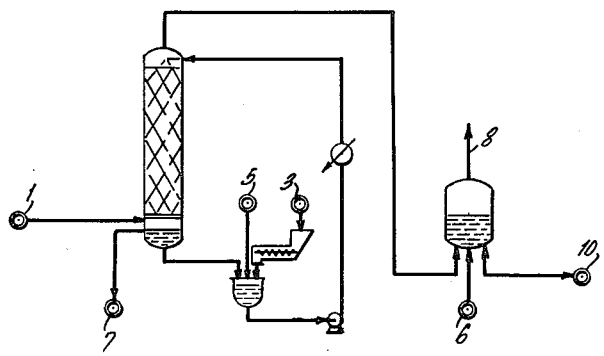
FIG. 4 is a flow sheet of an alternative embodiment to FIG. 2, and in which hexamethylene tetramine is also produced.

(c) Finally, all the urea needed can be fed without water to the solution circulating in the first absorption stage which is kept at such a temperature that formaldehyde and water vapour are condensed in the desired ratio in the solution to be produced; in this way the outlet gas still contains relatively low amounts of formaldehyde; the recovery of this formaldehyde as a 36–37% aqueous solution is normally costly due to the many absorption stages needed, but it is possible to produce a diluted aqueous solution 9 of formaldehyde if a use therefor is available (FIG. 3) or to block the formaldehyde by means of ammonia thus producing hexamethylenetetramine 10 (FIG. 4).

As a material for all the apparatuses required for realizing the process here described, it is convenient to use stainless steel. Satisfactory results are also obtained by employing aluminium except for the devices for feeding the alkali needed for neutralizing formic acid. The use of carbon steels must be avoided since rust traces are sufficient to color the product.

The following examples are presented in order to illustrate the present invention without limiting its scope. The term Nm.³/h. is used herein to denote "normal" cubic meters per hour, "normal" in turn meaning the gas volume calculated for 0° C. temperature at a pressure of 760 mm. of mercury.

*Example 1*

This example is reported with reference to FIG. 1 of the accompanying drawing. The gas leaving a plant for oxidizing methanol (284 Nm.³/h.) and containing formaldehyde (23 kg./h.), water vapour (22 kg./h.) and inert gases is washed in a packed column with a re-circulating solution. This solution contains 49% formaldehyde, 21.3% urea and 29.7% water. The gas leaving the column at a temperature of 55° C. still contains formaldehyde (5 kg./h.) and water vapour (24 kg./h.). This gas is then passed through a 15-bubble-cap-plates tower fed from the top with a 38.5% aqueous urea solution (26 kg./h.). In this column the gas, before it is discharged, is freed of the residual formaldehyde and is cooled to 48° C. No water condensation takes place, since at the aforementioned temperatures the vapour pressures on the solution of the first column and on the solution of the second column are equivalent. The solution leaving the bottom of the plate column contains therefore water (16 kg./h.), urea (10 kg./h.), and formaldehyde (5 kg./h.) and is added to the solution re-circulating in the packed column. A 30% sodium hydroxide solution (18–20 cc./h.) is also added to this solution in order to keep its pH at about 7.5. From the re-circulating solution a portion (47 kg./h.) is continuously withdrawn as a product of the plant. The solution in cycle amounts to about 300 kg. and therefore the permanence time at 55° C. is approximately 6.5 hours.

This time could presumably be reduced to less than 1 hour. The solution of the end plate of the second column is under such conditions of concentration and temperature that it does not present any turbidity within 3 to 4 hours. It is however convenient that its time of duration in the plant does not exceed half an hour. The pH of this solution spontaneously assumes a value of about 7.5 due to the presence of free urea.

*Example 2*

This example also is reported with reference to FIG. 1 of the accompanying drawing. The gas coming from a plant for oxidizing methanol to formaldehyde (5700 Nm.³/h.) and containing formaldehyde (450 kg./h.), water vapour (350 kg./h.) and inert gases, is washed in a packed column with a recirculating solution.

This solution contains 52% formaldehyde, 20% urea and 28% water. The gas leaving the column at a temperature of 48° C. still contains formaldehyde (100 kg./h.) and water vapour (370 kg./h.). This gas is then passed to a 15-bubble-cap-plates tower fed at top with a 53% aqueous urea solution (330 kg./h.).

In this column the gas, before being discharged in the air, yields the residual formaldehyde and 100 kg./h. water and is cooled to 42° C.

The solution leaving the plate column from its bottom, therefore, contains water (260 kg./h.), urea (175 kg./h.) and formaldehyde (100 kg./h.) and is added to the solution recirculating in the packed column. To this solution a 7% sodium hydroxide solution (2.5 kg./h.) is added in order to keep the pH at a value of 8.2. From the re-circulating solution a portion is continuously withdrawn as the product of the plant (870 kg./h.).

The amount of solution in cycle is in the order of about 5000 kg. and therefore the permanence time at about 50° C. is approximately 6 hours. The solution of the end plate of the second column is under such conditions of concentration and temperature that it does not present any turbidity within from 18 to 20 hours. It is however convenient that the time of its permanence in the plant does not exceed 5 hours. The pH of this solution spontaneously assumes a value of about 7.5 due to he presence of free urea.

*Example 3*

This example relates to FIG. 2 in the accompanying drawing. The gas coming from a plant for oxidizing methanol and containing formaldehyde (450 kg./h.) water vapour (450 kg./h.) and inert gases is washed in a packed column with a recirculating solution.

This solution contains 60% formaldehyde, 27% urea and 13% water. The gas leaving the column at a temperature of 55° C. still contains formaldehyde (140 kg./h.) and water vapour (450 kg./h.).

Urea (150 kg./h.) fed to the dissolving tank by a dosing screw, is dissolved in the re-circulating solution. To the same tank a 20% sodium hydroxide solution (1 kg./h.) is also added in order to keep the solution at a pH of about 8.2.

The gas is then passed in a second 15-bubble-cap-plate column fed, through its top, with 100 kg./h. of a 50% aqueous urea solution.

In this column the gas yields the residual formaldehyde portion and 50 kg./h. water and is discharged through the chimney after having been cooled to 50° C. The solution produced in this column and then introduced into the preceding one, therefore, contains 100 kg./h. formaldehyde, 50 kg./h. urea and 100 kg./h. water.

This solution is kept at a pH higher than 7 due to the alkalinity of the urea solution fed.

*Example 4*

This example relates to FIG. 3 of the accompanying drawing. The gas (320 Nm.$^3$/h.) coming from a plant for oxidizing methanol, and containing formaldehyde (26 kg./h.) water vapour (26 kg./h.) and inert gases, is washed in a packed column with a re-circulating solution.

This solution contains 49% formaldehyde, 21.3% urea and 29.7% water. The gas leaving the column at the temperature of 40° C. still contains formaldehyde (3 kg./h.) and water vapour (11 kg./h.). Urea fed to the dissolving tank by a dosing screw is dissolved in the re-circulating solution. A 30% sodium hydroxide solution (15–16 cc./h.) is introduced into the same tank in order to keep the solution at a pH value of about 7.5. A portion of the solution is continuously withdrawn from the plant as end product (47 kg./h.).

The amount of the solution in the cycle is 300 kg. and therefore the duration time of the same in the plant is about 6.5 hours. This time could be reduced to less than 2 hours.

The gas leaving the column is passed through a second 15-bubble-cap-plate column to the top of which water is fed (16 kg./h.).

The gas leaves the column at a temperature of 20° C. after having yielded the residual formaldehyde and a portion of water vapour (6 kg./h.) to the solution. From the bottom of the column a 12% formaldehyde solution in water (25 kg./h.) is recovered as the side product of the plant.

The term: "gaseous medium" is used herein to define any gas inert to a mixture of urea, formaldehyde plus formic acid vapor.

As a result of the process of the present invention as herein described, solutions of urea-formaldehyde are obtained which are perfectly clear and stable at temperatures between −30° and +55° C. The solutions obtained maybe used with remarkable advantages as substitutes for aqueous formaldehyde solution in all uses and processes whose purpose it is to obtain urea-formaldehyde condensation products.

It will be obvious to those skilled in the art, upon a study of this disclosure, that our invention permits of various modifications and alterations with respect to the individual apparatus components and method steps disclosed, and hence can be embodied in equipment other than as particularly illustrated and described herein, without departing from the essential features of the invention and within the spirit and scope of the claims annexed hereto.

We claim:

1. A process for absorbing gaseous formaldehyde from a gaseous medium which is inert to a mixture of urea and formaldehyde which contains formic acid vapor to result in a high absorption yield, comprising the steps of feeding an aqueous urea solution in a multiple series of absorption stages of diminishing concentration of formaldehyde in said medium so as to form methylol-ureas in aqueous solution, said urea solution being fed in counter-current flow to said medium containing the formaldehyde at a temperature of from 30° to 80° C., and at a pH of said solution from 7 to 9, maintaining said temperature range and pH value in the aqueous solution in the successive stages, and continuously absorbing the formaldehyde from said medium by dissolving it into the aqueous urea solution in the successive stages whereby methylol-urea is present in the solution at the absorption stage, the molar ratio of urea fed to formaldehyde fed being maintained between 1:4 and 1:10.

2. A process for preparing concentrated urea-formaldehyde solutions by dissolving formaldehyde from a gaseous medium into an aqueous urea solution in a multiple series of absorption contacting stages of diminishing concentration of formaldehyde in said medium, comprising introducing into a first stage a flow of formaldehyde in a gaseous medium which is inert to a mixture of urea and formaldehyde which contains formic acid vapor, feeding to the final absorption stage an aqueous solution of urea, passing the resulting solution of urea and formaldehyde from said final stage through successive absorption stages to the first stage and in counter-current flow to said medium containing formaldehyde, contacting, in the first absorption stage, a circulating aqueous solution of urea and formaldehyde at a temperature between 30° and 80° C. and at a pH of between 7 and 9 with a mixture of formaldehyde and said inert gaseous medium, the formaldehyde in said mixture entering said first stage being in highest concentration of all of said multiple stages, the urea concentration of said aqueous solution of urea and formaldehyde entering said first stage being maintained at a predetermined value corresponding to the desired concentration of the end product solution of the first stage, the molar ratio of urea fed to formaldehyde fed being maintained between 1:4 and 1:10, said contacting in said first stage being maintained for a length of time sufficient for the formation of methylol-urea therein, maintaining said pH value in the aqueous solution in said successive stages, neutralizing the formic acid formed in said stages by adding alkalis, and controlling the working temperature of the final absorption stage at 5° to 10° less than the temperature in said first stage and within a range from 25° to 70° C. as determined by the concentration of the urea solution fed to said final absorption stage in order to obtain substantially complete absorption of gaseous formaldehyde in said urea solution of said final stage, whereby methylol-urea is present in the solution at the absorption stage.

3. A process according to claim 2, further defined in that the urea concentration of said aqueous solution fed to said final stage is maintained at a maximum concentration of approximately 50% by weight of the total solution.

4. A process according to claim 2, further defined in that the urea in said aqueous solution fed to said final stage is maintained at a concentration corresponding to the saturation point thereof at a temperature slightly lower than the working temperature of said final absorption stage.

5. A process for preparing concentrated urea-formaldehyde solutions by dissolving formaldehyde from a gaseous medium which is inert to a mixture of urea and formaldehyde which contains formic acid vapor into an aqueous urea solution in a multiple series of absorption stages of diminishing concentration of formaldehyde in said medium, comprising feeding a mixture of formaldehyde and the gaseous medium into a first stage in counter-current flow to a recirculating aqueous solution of urea and formaldehyde at a temperature between 30° and 80° C. and at a pH of between 7 and 9 so as to form methylol-urea in aqueous solution, introducing an aqueous urea solution containing a maximum concentration of 50% urea by weight of the total solution in counter-current flow into the last of said multiple stages so as to chemically block the formaldehyde contained in the gas entering said last stage, maintaining said temperature range and pH value in the aqueous solution in the successive stages whereby methylol-urea is present in the solution at the absorption stage, the molar ratio of urea fed to formaldehyde fed being maintained between 1:4 and 1:10, adding, in a step intermediate said first and last stages, a portion of dry urea to the liquid from said last stage and the recirculating liquid from said first stage, neutralizing formic acid formed by adding alkali in said first stage to maintain said pH of 7 to 9.

6. A process for preparing concentrated urea-formaldehyde solutions by dissolving formaldehyde from a gaseous medium which is inert to a mixture of urea and formaldehyde which contains formic acid vapor into an aqueous urea solution in an absorption stage, comprising feeding a mixture of formaldehyde and the gaseous medium in counter-current flow to a recirculating aqueous solution of urea and absorbed formaldehyde at a pH of between 7 and 9 so as to form methylol-ureas in aqueous solution, adding urea only in dry form without water to said recirculating solution to maintain the urea concentration thereof at a predetermined value equivalent to the desired concentration of the end product solution of said stage whereby methylol-urea is present in the solution at the absorption stage, the temperature in said first stage being maintained at a predetermined temperature within the range of approximaely 30° to 80° C. and corresponding to the condensation temperature of equilibrium of formaldehyde and water vapor in the desired ratio in the solution to be produced, the molar ratio of urea fed to formaldehyde fed being maintained between 1:4 and 1:10, and recovering the formaldehyde present in the gaseous medium leaving said absorption stage.

7. A process for preparing concentrated urea-formaldehyde solutions by dissolving formaldehyde from a gaseous medium which is inert to a mixture of urea and formaldehyde which contains formic acid vapor into an aqueous urea solution in at least one absorption stage, comprising feeding formaldehyde in said gaseous medium into said absorption stage in counter-current flow to a recirculating aqueous solution of urea and absorbed formaldehyde at a pH of between 7.5 and 8.5 and at a predetermined temperature within the range of approximately 30° to 80° C. and corresponding to the condensation temperature of equilibrium of formaldehyde and water vapor in the desired ratio in the solution to be produced so as to form methylol-ureas in aqueous solution, and maintaining said temperature range and pH value in the aqueous solution in each stage, the molar ratio of urea fed to formaldehyde fed being maintained between 4:1 and 1:10, whereby methylol-urea is present in the solution at the absorption stage.

8. A process for preparing concentrated urea-formaldehyde solutions by dissolving formaldehyde from a gaseous medium which is inert to a mixture of urea and formaldehyde which contains formic acid vapor into an aqueous urea solution in a multiple series of absorption stages of diminishing concentration of formaldehyde in said medium, comprising feeding a mixture of formaldehyde and the gaseous medium into a first stage in counter-current flow to a recirculating aqueous solution of urea and formaldehyde at a temperature between 30° and 80° C. and at a pH of between 7 and 9 so as to form methylol-ureas in aqueous solution, introducing an aqueous urea solution containing a maximum concentration of 50% urea by weight of the total solution in counter-current flow into the last of said multiple stages so as to chemically block the formaldehyde contained in the gas entering said last stage, maintaining said temperature range and pH value in the aqueous solution in the successive stages whereby methylol-urea is present in the solution at the absorption stage, the molar ratio of urea fed to formaldehyde fed being maintained between 1:4 and 1:10, adding, in a step intermediate said first and last stages, a portion of dry urea to the liquid from said last stage and the recirculating liquid from said first stage, neutralizng formic acid formed by adding alkali in said intermediate stage to maintain said pH of 7 to 9.

9. Process according to claim 6, said step of recovering the formaldehyde comprising passing said gaseous medium leaving the absorption stage through a dilute aqueous solution to absorb the formaldehyde therein so as to obtain a diluted aqueous formaldehyde solution.

10. Process according to claim 9, including the further step of adding ammonia to said dilute aqueous solution for absorbing the formaldehyde so as to obtain hexamethylene tetramine.

References Cited in the file of this patent

UNITED STATES PATENTS

| | | |
|---|---|---|
| 1,507,624 | Pollak et al. | Sept. 9, 1924 |
| 1,987,601 | Burke | Jan. 15, 1935 |
| 2,321,544 | Dittmar et al. | June 8, 1943 |
| 2,467,212 | Kvalnes | Apr. 12, 1949 |
| 2,946,403 | Krueger et al. | July 26, 1960 |

OTHER REFERENCES

Walker: Formaldehyde, 2nd edition, Reinhold Publication Corp., New York, pp. 281–320.